United States Patent [19]
Prüss et al.

[11] Patent Number: 5,333,512
[45] Date of Patent: Aug. 2, 1994

[54] MULTISTAGE TRANSMISSION WITH AN AUTOMATIC LOAD-SHIFT SPUR GEAR

[75] Inventors: Ludwig Prüss, Braunschweig; Reinhard Kappel, Wolfsburg, both of Fed. Rep. of Germany

[73] Assignee: Volkswagen AG, Wolfsburg, Fed. Rep. of Germany

[21] Appl. No.: 985,591

[22] Filed: Dec. 3, 1992

[30] Foreign Application Priority Data

Dec. 16, 1991 [DE] Fed. Rep. of Germany ....... 4141395

[51] Int. Cl.⁵ .............................................. F16H 3/08
[52] U.S. Cl. .......................................... 74/331; 74/325
[58] Field of Search ............................ 74/325, 329, 331

[56] References Cited

U.S. PATENT DOCUMENTS

| | | | |
|---|---|---|---|
| 4,461,188 | 7/1984 | Fisher | 74/331 X |
| 4,565,106 | 1/1986 | Sumiyoshi | 74/331 X |
| 4,738,149 | 4/1988 | Janiszewski | 74/331 X |
| 4,776,227 | 10/1988 | Janiszewski | 74/331 |
| 4,799,395 | 1/1989 | Janiszewski | 74/331 |
| 5,079,965 | 1/1992 | Leber et al. | 74/331 |

FOREIGN PATENT DOCUMENTS 0367020  5/1990  Fed. Rep. of Germany .

Primary Examiner—Leslie A. Braun
Assistant Examiner—David W. Laub
Attorney, Agent, or Firm—Brumbaugh, Graves, Donohue & Raymond

[57] ABSTRACT

An automatic multistage transmission for vehicles has an input shaft and two output shafts parallel to the input shaft and includes two gear stages which are capable of shifting by way of frictional engagement and other gear stages engagable by gear tooth engagement. In pull operation, the first transmission stage is constantly in engagement by means of a rotatably supported gear connectable through a first sliding bushing. The fixed gear of the first transmission stage is coupled through a reversing pinion to a reversing gear rotatably supported on one of the output shafts which can be connected through a second sliding bushing to the output shaft on which it is mounted.

8 Claims, 1 Drawing Sheet

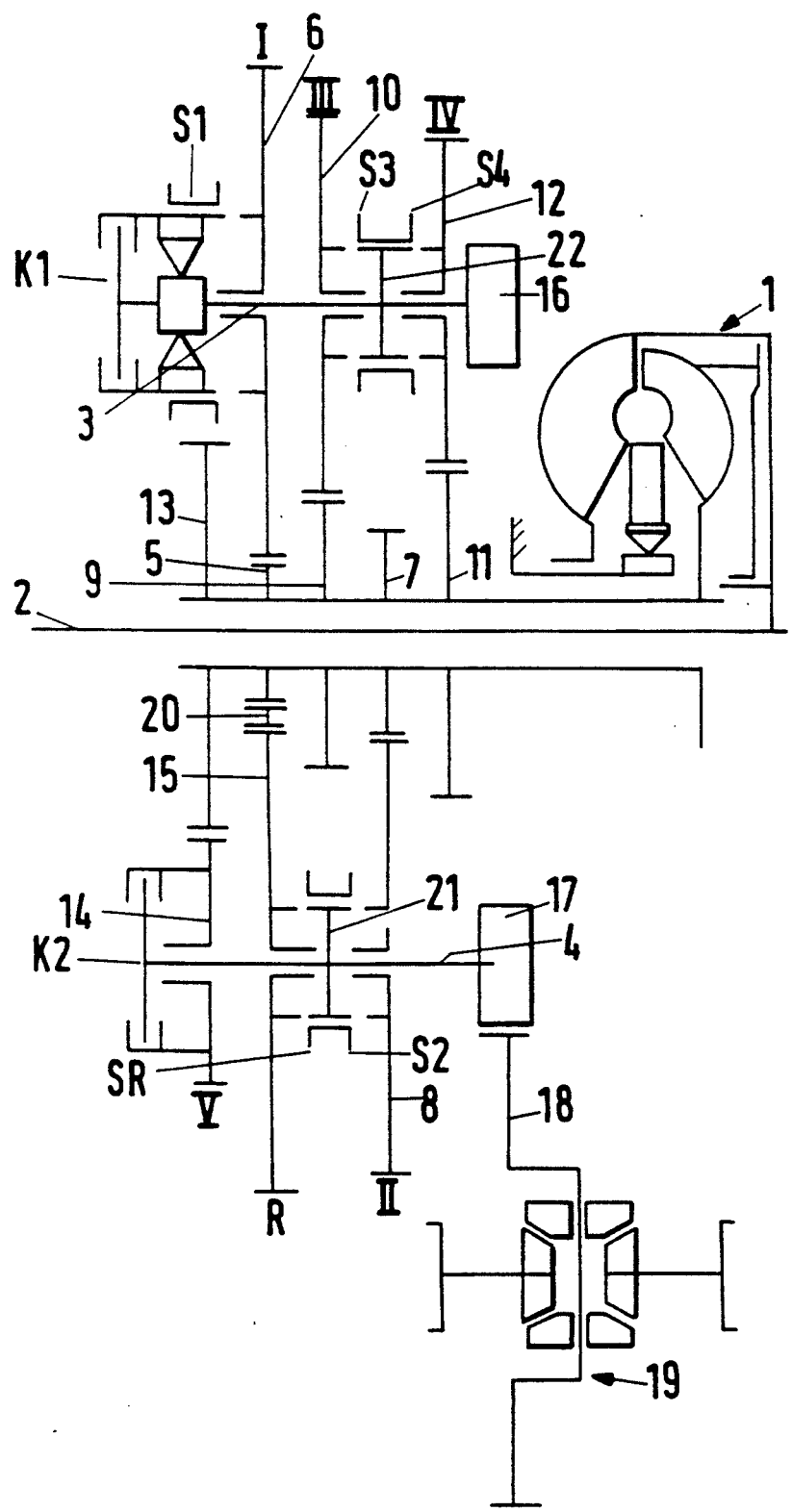

MULTISTAGE TRANSMISSION WITH AN AUTOMATIC LOAD-SHIFT SPUR GEAR

BACKGROUND OF THE INVENTION

This invention relates to multistage transmissions having an automatic load-shift spur gear.

It is known to provide vehicles with a multistage transmission arrangement including a drive shaft connectable, by way of a first clutch, with a drive motor, at least one output shaft connectable with the drive wheels of the vehicle, a plurality of pairs of gears, each pair including one spur gear carried as a fixed gear on a gear shaft and an associated spur gear rotatably supported on another gear shaft, wherein the rotatably supported gear is connectable through gear tooth engagement or through a friction clutch with the gear shaft on which it is rotatably supported, and also including at least one additional clutch to provide a driving connection between a rotatably supported gear and its associated gear shaft.

Published European Application No. 0 367 020 discloses a five-stage transmission of the above type wherein the gears of the first four transmission stages are shifted by gear tooth engagement while the fifth transmission gear stage is shifted by frictional engagement through a controllable multiple-disk clutch. The four fixed gears of the first, second, third and fourth transmission gear stages and the rotatably supported gear of the fifth transmission gear stage are supported on the drive shaft, while the fixed gear of the first transmission gear stage is disposed adjacent to the starting clutch. In the disclosed transmission, a second clutch is capable of operation in a slip state, i.e., in partial engagement.

In that transmission, a gear stage being connected to initiate an upshift procedure is partially engaged while the original transmission gear stage is still engaged. Consequently, a branching of the driving torque occurs during the gear stage change, i.e., one part of the driving torque is still transmitted through the original gear stage, while the remaining driving torque is being supplied to the transmission output through the gear stage being connected. When the originally engaged gear stage is finally disengaged, for example, after the torque transmitted through that stage drops below a predetermined level, all of the driving torque is transmitted through the new transmission gear stage. Because of this branching of the driving torque before interruption of the original gear stage, loss of propulsive force during the upshift procedure is reduced to a minimum. Moreover, comfortable upshift procedures are made possible without being selectively influenced by the operating state of the engine. In this way, the functional operation of a multistage transmission can be controlled largely automatically. Furthermore, the highest gear stage is used as a connectable gear stage since its rotatably supported gear is connectable with the gear shaft carrying it by way of a second clutch operable in the slip state. Consequently, this arrangement always has a greater transmission ratio compared to any other gear arrangement and is connectable under load. The second clutch thus transmits torque during the shift operation and, after disengagement of the original gear stage, it provides speed reduction or speed synchronization for the next higher gear stage during upshift.

Synchronization during downshift of the transmission into engine push operation is not provided completely by engine management, since risks arise, for example, during trailer towing and running downhill, as a result of unrestricted speed-up of the engine for synchronization of the system. There is an especially great risk in push operation when, because of a nonshiftable condition, a new lower gear cannot be engaged, and the vehicle is accelerated rather than decelerated.

SUMMARY OF THE INVENTION

Accordingly, it is an object of the present invention to provide an improved multistage transmission which overcomes the disadvantages of the prior art.

Another object of the invention is to provide a multistage transmission which has a compact configuration and provides smooth operation during gear stage changes.

These and other objects of the invention are attained by providing a multistage transmission having an input shaft and two output shafts disposed parallel to the input shaft, both of which are coupled to the transmission output to supply driving torque to the drive wheels of the vehicle, two of the transmission gears being shiftable by frictional engagement and the other gears being shiftable by gear tooth engagement. During pull operation, a rotatably supported gear of the first transmission gear stage is continuously driven by engagement with a sliding bushing and a fixed gear of the first transmission gear stage continuously drives, through a reversing pinion, a gear of the reverse gear transmission stage which is rotatably supported on an output shaft and is capable of being connected by a second sliding bushing to the output shaft on which it is supported.

In addition, to prevent any tension or transmission failure from occurring on engagement of the reverse gear, the freely supported gear of the first gear transmission stage can be disengaged by motion of the sliding bushing to interrupt first-gear engagement during pull operation. Consequently, even in case of a possible breakdown of engine management because of malfunction of the electrical system in the transmission, the transmission will still be operative in the first gear by the direct application of fluid to the starting clutch. In this connection, it is advantageous to provide a torque converter for starting since it has the function of two shift gears.

Additional reliability of the system can be provided if the synchronizing clutch can be actuated by the electronic or electrohydraulic system in a safety circuit so as to ensure push-pull operation. In this case, the starting clutch also has to assure at least a residual functional reliability (by constant slippage or the like) or else be designed as a torque converter.

A wet friction clutch has better wear behavior as a starting clutch compared to dry friction clutches. In principle, however, the starting clutch may alternatively be a simple friction clutch of the type customarily found in manual shift transmissions. A transmission system with an automatically controlled friction clutch has the advantage of requiring less oil and thus a small pumping energy requirement. The efficiency of the transmission is greater when, for example, the advantage of a torque converter as a starting clutch is dispensed with.

In this connection, it is advantageous if a torque converter with an integrated pump used as a starting clutch is located on the drive shaft at the level of the clutches.

For added improvement of the efficiency of the transmission, a drivable friction or fluid clutch, controlled by way of an external electric pump, may be provided to apply pressure on a shift member of the drive train. In this case, the external electric pump may be connected to the battery of the vehicle. This generation of pressure makes it possible to drive the vehicle independently of engine operation. The required pump capacity may be substantially reduced by providing a pressure reservoir between the electric pump and the associated clutch to reduce the output demand on the pump that can occur as a result of the brief requirement for a high volume of oil upon the application of pressure.

In addition, it is advantageous if the rotatably mounted gear of the first transmission gear stage is connectable through a synchronizing clutch with the output shaft carrying that gear. The synchronizing clutch serves to accelerate the output shaft speed on downshift in push operation. Because of the smaller friction losses resulting from lower differential speeds between the inner and outer clutch disks, this synchronizing clutch should be located on an output shaft. Then, if the load is too high for an integrated release during engine push operation in the first gear stage, downshift to the first gear stage in push operation could alternatively be dispensed with, i.e., engine push could be used to downshift only the second gear. In that case, the synchronizing clutch would only be required to synchronize on downshift.

In addition, it is advantageous if the rotatably supported gear of the fifth transmission gear stage is connectable with the second output shaft through a multiple-disk clutch. Thus, the first and fifth gears are capable of shifting by frictional engagement.

The rotatably supported gear of the reverse gear transmission stage may be a helical gear since this gear need not be shifted axially. Such helical gearing results in good tooth engagement and hence in a reduction of running noise. The arrangement of the gears for the reverse gear stage is especially advantageous, since it results in practically no extension of the transmission in the axial direction of the transmission shafts.

The transmission according to the invention is capable of automatic shifting and thus is capable of synchronization partly electronically and partly conventionally. In the case of fully automatic gear selection, the drive power is transferred with optimal efficiency. Because of the three-shaft arrangement and the combination of the individual gear stages, an extremely short structural shape is obtained, with an especially favorable arrangement and favorable speed ratios for the reverse gear. Automatic shifting, free of drive torque interruption, is possible with increased functional reliability. Also, the oil requirement is small.

BRIEF DESCRIPTION OF THE DRAWING

Further objects and advantages of the invention will be apparent from a reading of the following description in conjunction with the accompanying drawing, which is a schematic view in longitudinal section showing the arrangement of a representative five-stage automatic spur gear transmission arranged according to the invention.

DESCRIPTION OF PREFERRED EMBODIMENT

In the typical embodiment of the invention illustrated schematically in the drawing, a three-shaft transmission includes a drive shaft 2, connectable with a drive motor (not shown) by way of a starting clutch 1 in the form of a torque converter, and two output shafts 3 and 4 mounted parallel to the drive shaft.

Five separate transmission stages I through V have five corresponding pairs of gears 5 and 6, 7 and 8, 9 and 10, 11 and 12 and 13 and 14, respectively. In each of those pairs, one spur gear 5, 7, 9, 11 and 13 is fixedly mounted on the drive shaft 2 and the other spur gear 6, 8, 10, 12 and 14 is rotatably supported on an output shaft, the gears 6, 10 and 12 being mounted on the first output shaft 3 and the gears 8 and 14 being mounted on the second output shaft 4. The two output shafts 3 and 4 are in engagement, through corresponding pinions 16 and 17, with a ring gear 18 connected to a differential 19 for the drive wheels of the vehicle. In addition, a reverse transmission gear stage R has a gear 15 rotatably supported on the output shaft 4 and coupled to the drive shaft gear 5 through a reversing pinion 20.

Each of the two output shafts 3 and 4 carries a multiple-disk clutch K1 and K2, respectively. The clutch K1 is a synchronizing clutch which is arranged to connect the rotatably supported gear 6 of the first gear stage I to the output shaft 3 on which it is mounted. During pull operation, the first gear stage I is continuously engaged by means of a rotatably supported freewheel gear F which is connectable to the gear 6 through a first sliding bushing S1.

The first gear stage fixed gear 5 continuously drives the rotatably supported reversing gear 15 on the second output shaft 4 through the reversing pinion 20 and the gear 15 is connectable to the second output shaft 4 through a second sliding bushing SR when the bushing slides to the left as viewed in the drawing to connect the gear 15 to a fixed gear 21. In addition, the rotatably supported gear 8 of the second transmission gear stage II is connectable to the second output shaft 4 through the gear 21 and an engagement surface S2 of the second sliding bushing SR when the bushing slides to the right as viewed in the drawing.

The rotatably supported gear 14 of the fifth transmission gear stage V is connectable with the second output shaft 4 through the multiple-disk clutch K2.

A third sliding bushing having engagement surfaces S3 and S4 and supported on a gear 22 mounted on the first output shaft 3 is optionally capable of connecting the shaft to the rotatably supported gear 10 of the third transmission gear stage III or to the rotatably supported gear 12 of the fourth transmission gear stage IV.

The drawing clearly illustrates that the gears for the reverse gear stage require no additional axial structural length. Thus, the transmission as illustrated is extremely short.

The actuation of the sliding bushings S1-S4 and SR, the clutches K1 and K2, and the freewheel gear F required for each of the various forward and reverse transmission gear stages I-V and R, is illustrated by entry of an "X" in Table 1 below. Actuation only when the engine is in the braking (push) mode of operation is indicated by an "(X)".

TABLE 1

| Gear Stage | Sliding Bushing | | | | | Clutch | | Free Wheel Gear |
|---|---|---|---|---|---|---|---|---|
| | S1 | S2 | S3 | S4 | R | K1 | K2 | F |
| I | X | | | | | (X) | | X |
| II | X | X | | | | | | |
| III | X | | X | | | | | |
| IV | X | | | X | | | | |

TABLE 1-continued

| Gear Stage | Sliding Bushing | | | | | Clutch | | Free Wheel Gear |
|---|---|---|---|---|---|---|---|---|
| | S1 | S2 | S3 | S4 | R | K1 | K2 | F |
| V | X | | | | | | X | |
| R | | | | | X | | | |

Although the invention has been described herein with reference to a specific embodiment, many modifications and variations therein will readily occur to those skilled in the art. Accordingly, all such variations and modifications are included within the intended scope of the invention.

We claim:

1. An automatic multistage transmission for a vehicle comprising a drive shaft connectable by a first clutch to a drive motor, first and second output shafts mounted parallel to the drive shaft and connected through corresponding pinions with the drive wheels of the vehicle, a plurality of pairs of gears providing corresponding transmission gear stages, each gear pair including one spur gear mounted as a fixed gear on one of the driveshaft and the first and second output shafts and another spur gear rotatably supported on another of the driveshaft and the first and second output shafts and being connectable with its supporting shaft for the purpose of engaging the corresponding transmission gear stage, at least one clutch arranged to connect a rotatably supported gear with the shaft on which it is supported, two of the transmission gear stages being engagable by friction engagement and the other transmission gear stages being engagable by gear tooth engagement, the first transmission gear stage being constantly in engagement during pull operation by means of a rotatably supported freewheel gear capable of being coupled by a first sliding bushing, the fixed gear of the first transmission gear stage being coupled through a reversing pinion to a rotatably supported gear of a reverse transmission gear stage which is mounted on one of the first and second output shafts and is capable of being coupled to that output shaft by a second sliding bushing.

2. A transmission according to claim 1 wherein the rotatably supported gear of the first transmission gear stage is connectable through a synchronizing clutch with the output shaft on which it is supported.

3. A transmission according to claim 1 wherein the rotatably supported gears for the first, third and fourth transmission gear stages are supported on the first output shaft and the rotatably supported gears for the second, fifth and reverse transmission gear stages are supported on the second output shaft.

4. A transmission according to claim 1 wherein the rotatably supported gear of the fifth transmission gear stage is connectable with the second output shaft by way of a multiple-disk clutch.

5. A transmission according to claim 1 wherein the rotatably supported gear of the reverse transmission gear stage has a helical gear shape.

6. A transmission according to claim 1 including a third sliding bushing connectable to the rotatably supported gear of the third or fourth transmission gear stage.

7. A transmission according to claim 1 wherein the rotatably supported gear of the second transmission gear stage is connectable to the output shaft on which it is mounted by way of the second sliding bushing.

8. A transmission according to claim 1 wherein the first clutch is a torque converter.

* * * * *